United States Patent [19]

Lagarelli

[11] 4,101,989

[45] Jul. 25, 1978

[54] VANDAL-PROOF FIXTURE HANDLE

[75] Inventor: Carmen J. Lagarelli, Clayton, Del.

[73] Assignee: Speakman Company, Wilmington, Del.

[21] Appl. No.: 723,893

[22] Filed: Sep. 16, 1976

[51] Int. Cl.² .................... F16K 21/00; E03C 1/04
[52] U.S. Cl. .................................................. 4/191
[58] Field of Search ................ 4/1, 191, 192, 195, 4/295; 49/171

[56] References Cited

U.S. PATENT DOCUMENTS

| 3,448,768 | 6/1969 | Keller | 4/192 X |
| 3,556,140 | 1/1971 | Politz | 4/191 X |
| 3,991,427 | 11/1976 | Kemker | 4/191 |

Primary Examiner—Henry K. Artis
Attorney, Agent, or Firm—Connolly and Hutz

[57] ABSTRACT

A concealed bore in a faucet handle is arranged to facilitate removal of a recessed cap on the handle covering the screw attaching the handle to the faucet stem.

2 Claims, 6 Drawing Figures

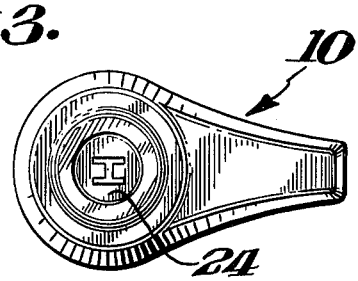
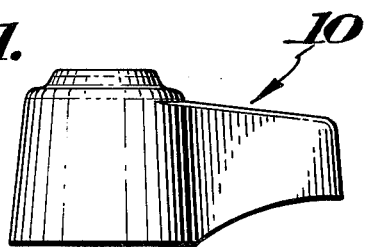
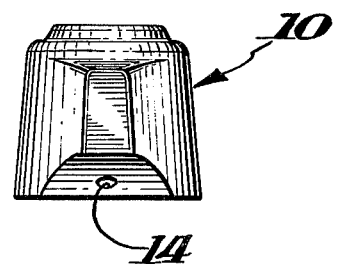
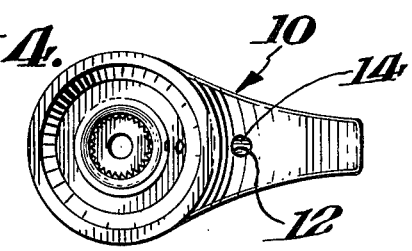
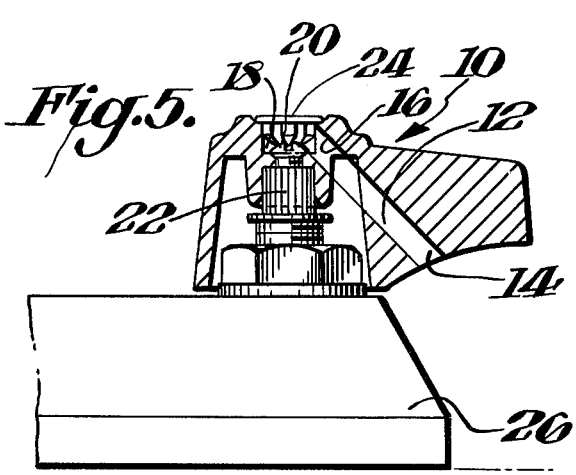
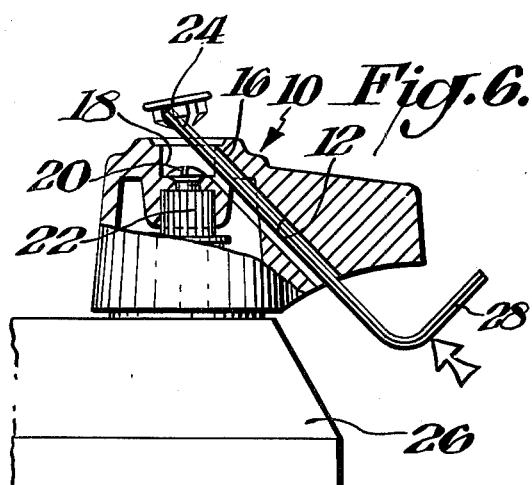

VANDAL-PROOF FIXTURE HANDLE

BACKGROUND OF THE INVENTION

One of the most troublesome and expensive problems facing owners of public or institutional facilities is vandalism and theft. This is particularly true of public and institutional washrooms where everything that is not bolted down will be carried away. One such item is the faucet handle.

Some attempts have been made to prevent theft of such handles but they in turn have the disadvantage of making it extremely difficult to repair the faucet because of semi-permanent connection of the handle to the stem.

SUMMARY OF THE INVENTION

The present invention provides a unique, yet inexpensive solution to vandalism of plumbing fixture parts. A bore is provided in the fixture handle which extends from a concealed entrance in the bottom of the handle to a location near the screw attaching the handle to the fixture. The screw is concealed from view and physical access by a recessed, snap-fit cap. By inserting a long rod or tool into the bore the snap-fit cap can be popped off giving repairmen easy access to the screw or other fastening device holding the handle to the fixture.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 1 is a side elevational view of a vandal proof handle of this invention;

FIG. 2 is an end elevational view of the handle;

FIG. 3 is a top plan view of the handle;

FIG. 4 is a bottom plan view of the handle;

FIG. 5 is a cross-sectional view of the vandal proof handle attached to a fixture; and FIG. 6 is a partial cross-sectional view of the vandal proof handle illustrating the removal of the cap to allow access to the handle attachment screw.

DESCRIPTION OF THE PREFERRED EMBODIMENTS

One type of vandal-proof handle 10 of this invention is illustrated in FIGS. 1-6, although the basic concept of the invention can be utilized in a wide range of fixture handle designs.

Located within the handle is bore 12 having an opening 14 at the bottom end thereof which is not readily visible or apparent to the normal user of the faucet handle. The upper end 16 of the bore 12 terminates in a recess 18 formed in the handle 10. This recess 18 formed in the handle accommodates a screw 20 or other fastener for attaching the handle 10 to the valve stem or spindle 22.

Access to the screw 20 by vandal prone users of the faucet 10 is prevented by the cap 24 which is snap fit into the upper portion of recess 18. The configuration of this upper portion of recess 18 is such that it is difficult, if not impossible, to pry cap 24 out of the recess. Thus the only way to remove the cap 24 to get to the screw 20 is through the hidden bore 12. Only maintenance personnel, of course, would be aware of the bore 12 and when they wish to repair the fixture 26 on which the handle 10 is placed they need only insert a tool such as an Allen wrench or the like 28 through the bore 12 to pop off the cap 24 and get access to the screw 20 (see FIG. 6) holding the handle 10 on the valve stem 22. This arrangement effectively prevents vandalism and theft of fixture parts.

What is claimed is:

1. A vandal-proof handle suitable for attachment to a movable shaft having a central axis, the handle having a central bore surrounding and coacting with the axis of the shaft the axis of the shaft, a recess in the upper portion of the handle aligned with the handle bore, removable retaining means located in the lower portion of said recess for attachment of the handle to the shaft, a removable cap arranged in the upper portion of the recess concealing the retaining means from view of the handle user, a concealed bore through a handle at an angle to the handle bore concealed said bore extending from an external surface of the handle not readily visible to a handle user under normal operation to that portion of the recess above the retaining means and below the cap, whereby the cap can be readily removed only by a device inserted through the concealed bore and into the recess to a point underlying and in contact with the cap.

2. The vandal-proof handle of claim 1 wherein the top of the cap is flush with the top of the handle and received in a mating annual groove located about the upper periphery of the recess, whereby the cap is not readily removable by a handle user other than by insertion of a device through the concealed bore.

* * * * *